United States Patent
Teal et al.

(10) Patent No.: US 8,061,728 B2
(45) Date of Patent: Nov. 22, 2011

(54) INTERLOCKING GUIDE TRACKS FOR ELLIPTICAL BIKE AND METHOD OF USE

(75) Inventors: Brent C. Teal, Solana Beach, CA (US);
Bryan L. Pate, Atherton, CA (US)

(73) Assignee: PT Motion Works, Inc., Solana Beach, CA (US)

( * ) Notice: Subject to any disclaimer, the term of this patent is extended or adjusted under 35 U.S.C. 154(b) by 0 days.

(21) Appl. No.: 12/782,053

(22) Filed: May 18, 2010

(65) Prior Publication Data
US 2010/0295263 A1 Nov. 25, 2010

Related U.S. Application Data

(60) Provisional application No. 61/179,644, filed on May 19, 2009, provisional application No. 61/179,647, filed on May 19, 2009.

(51) Int. Cl.
B62M 1/04 (2006.01)
B62M 1/02 (2006.01)

(52) U.S. Cl. ........................................ 280/221; 280/253
(58) Field of Classification Search .................. 280/221, 280/256, 252, 253
See application file for complete search history.

(56) References Cited

U.S. PATENT DOCUMENTS

| | | |
|---|---|---|
| 1,190,089 A | 7/1916 | Bellairs |
| 1,601,249 A | 9/1926 | Hayden |
| 1,617,357 A | 2/1927 | Walter |
| 1,750,187 A | 3/1930 | Miller et al. |
| 2,424,639 A | 7/1947 | Sobiral |
| 2,466,105 A | 4/1949 | Hoffman |
| 2,723,131 A | 11/1955 | McChesney, Jr. |
| 4,026,571 A | 5/1977 | Vereyken |
| 4,077,648 A | 3/1978 | Seul |
| 4,193,324 A | 3/1980 | Marc |
| 4,379,566 A | 4/1983 | Titcomb |
| 4,456,276 A | 6/1984 | Bortolin |

(Continued)

FOREIGN PATENT DOCUMENTS

CA 2434373 8/1996

(Continued)

OTHER PUBLICATIONS

International Search Report and Written Opinion from PCT/US2010/035281 issued Dec. 3, 2010, 8 pages.

(Continued)

*Primary Examiner* — Paul N Dickson
*Assistant Examiner* — Wesley Potter
(74) *Attorney, Agent, or Firm* — Stephen C. Beuerle; Procopio Cory Hargreaves & Savitch LLP

(57) ABSTRACT

An apparatus includes a frame with a pivot axis defined thereupon; a drive wheel coupled to the frame; a first and a second foot link operably coupled to the drive wheel to transfer power to the drive wheel so as to propel the apparatus, each including a foot receiving portion for receiving an operator's foot, a front end, and a rear end; and a pair of internal guide track systems coupled to the frame, each internal guide track system being operative to engage the front end of each foot link internal to the internal guide track system and to direct the front end along a reciprocating path of travel while providing retention to each foot link.

26 Claims, 4 Drawing Sheets

U.S. PATENT DOCUMENTS

| | | | |
|---|---|---|---|
| 4,577,879 A | 3/1986 | Vereyken | |
| 4,666,173 A | 5/1987 | Graham | |
| 4,761,014 A | 8/1988 | Huang | |
| 4,850,245 A | 7/1989 | Feamster et al. | |
| 4,973,046 A | 11/1990 | Maxwell | |
| 5,110,148 A | 5/1992 | Stienbarger | |
| 5,161,430 A | 11/1992 | Febey | |
| 5,192,089 A | 3/1993 | Taylor | |
| 5,224,724 A | 7/1993 | Greenwood | |
| 5,261,294 A | 11/1993 | Ticer et al. | |
| 5,352,169 A | 10/1994 | Eschenbach | |
| 5,368,321 A | 11/1994 | Berman et al. | |
| 5,383,829 A | 1/1995 | Miller | |
| 5,419,572 A | 5/1995 | Stiller et al. | |
| 5,433,680 A | 7/1995 | Knudsen | |
| 5,458,022 A | 10/1995 | Mattfeld | |
| 5,527,246 A | 6/1996 | Rodgers, Jr. | |
| 5,566,589 A | 10/1996 | Buck | |
| 5,566,590 A | 10/1996 | Wan | |
| 5,591,107 A | 1/1997 | Rodgers, Jr. | |
| 5,611,757 A | 3/1997 | Rodgers, Jr. | |
| 5,879,017 A | 3/1999 | Debruin | |
| 5,893,820 A | 4/1999 | Maresh et al. | |
| 5,947,872 A * | 9/1999 | Ryan et al. | 482/51 |
| 6,024,676 A | 2/2000 | Eschenbach | |
| 6,077,198 A | 6/2000 | Eschenbach | |
| 6,146,313 A | 11/2000 | Whan-Tong et al. | |
| 6,270,102 B1 | 8/2001 | Fan | |
| 6,398,244 B1 | 6/2002 | Chueh | |
| 6,398,695 B2 | 6/2002 | Miller | |
| 6,439,590 B1 | 8/2002 | Liang | |
| 6,454,287 B1 * | 9/2002 | Fujiwara et al. | 280/252 |
| 6,474,193 B1 | 11/2002 | Farney | |
| 6,485,041 B1 | 11/2002 | Janssen | |
| 6,551,217 B2 * | 4/2003 | Kaganovsky | 482/51 |
| 6,572,128 B2 | 6/2003 | Graf | |
| 6,589,139 B1 | 7/2003 | Butterworth | |
| 6,640,662 B1 | 11/2003 | Baxter | |
| 6,648,353 B1 | 11/2003 | Cabal | |
| 6,648,355 B2 | 11/2003 | Ridenhour | |
| 6,659,486 B2 | 12/2003 | Eschenbach | |
| 6,663,127 B2 | 12/2003 | Miller | |
| 6,688,624 B2 | 2/2004 | Christensen et al. | |
| 6,689,019 B2 | 2/2004 | Ohrt et al. | |
| 6,715,779 B2 | 4/2004 | Eschenbach | |
| 6,726,600 B2 | 4/2004 | Miller | |
| 6,773,022 B2 | 8/2004 | Janssen | |
| 6,857,648 B2 | 2/2005 | Mehmet | |
| 6,895,834 B1 | 5/2005 | Baatz | |
| 7,041,034 B1 * | 5/2006 | Stearns et al. | 482/52 |
| D526,250 S | 8/2006 | Trumble et al. | |
| 7,140,626 B1 | 11/2006 | Keay | |
| 7,244,217 B2 | 7/2007 | Rodgers, Jr. | |
| 7,448,986 B1 | 11/2008 | Porth | |
| 7,686,114 B2 * | 3/2010 | Kim | 180/205 |
| 7,717,446 B2 | 5/2010 | Pate | |
| 7,784,808 B2 * | 8/2010 | Fan | 280/221 |
| 2002/0151412 A1 | 10/2002 | Lee | |
| 2003/0025293 A1 | 2/2003 | Drew | |
| 2003/0193158 A1 | 10/2003 | Hung | |
| 2004/0259692 A1 * | 12/2004 | Martin et al. | 482/52 |
| 2005/0245358 A1 * | 11/2005 | Mercado et al. | 482/52 |
| 2005/0248117 A1 | 11/2005 | Hung | |
| 2007/0024019 A1 | 2/2007 | Tarlow | |
| 2007/0114749 A1 | 5/2007 | Tal | |
| 2007/0235974 A1 | 10/2007 | Vargas | |

FOREIGN PATENT DOCUMENTS

| | | |
|---|---|---|
| CA | 2670278 A1 | 11/2007 |
| KR | 20-0418734 Y1 | 6/2006 |
| KR | 10-2009-0043621 A | 5/2009 |
| WO | 03022670 | 3/2003 |

OTHER PUBLICATIONS

European Communication and Supplementary European Search Report for European Patent Application No. 07840033 dated Sep. 20, 2010.

* cited by examiner

US 8,061,728 B2

INTERLOCKING GUIDE TRACKS FOR ELLIPTICAL BIKE AND METHOD OF USE

CROSS-REFERENCE TO RELATED APPLICATIONS

This application claims priority to U.S. provisional patent application 61/179,644 filed on May 19, 2009 and U.S. provisional patent application 61/179,647 filed on May 19, 2009 under 35 U.S.C. 119(e). U.S. provisional patent application 61/179,644 and U.S. provisional patent application 61/179,647 are hereby incorporated by reference as though set forth in full.

BACKGROUND

1. Field of the Invention

The present invention relates generally to elliptical bikes, and particularly to guide tracks and features for elliptical bikes.

2. Related Art

U.S. Published Application 2008/0116655, which is incorporated by reference herein, discloses a self-propelled vehicle propelled by an elliptical drive train (hereinafter referred to as "elliptical bicycle"). In an elliptical bicycle, a user's feet are placed in foot platforms and the user strides forward and rearward, which though a variety of mechanical mechanisms, causes a rear wheel to rotate to propel the elliptical bicycle. The foot platforms, at a front end, are connected via foot links to respective load wheels that reciprocate along guide tracks of the bicycle frame. The load wheels must be secured to the guide tracks while also allowing relative reciprocating movement between the load wheels and the guide tracks/frame. In the past, additional coupling mechanisms have been provided to keep the load wheels on the guide tracks/frame; however, during some operations of the elliptical bicycle (e.g. when going over bumps), the load wheels may uncouple from the guide tracks/frame. Another problem that occurs is fast wear on the drive wheels and/or support surface of the guide tracks.

SUMMARY

An aspect of the invention involves an internal guide track system that ensures that the load wheels reciprocate efficiently along the guide tracks/frame while maintaining contact with the guide tracks/frame as part of a drive system that allows for a long stride length (>20 inches). An advantage of the internal guide track system is that it minimizes the likelihood that the forward end of the foot link will disengage with the frame and allows for a long stride length without the need for additional retention mechanisms.

The internal guide track system is comprised of one or more lower guide tracks and/or upper guide features contained inside of a tube or other hollow member which form the interface between the foot links and the frame of an elliptical bicycle. These upper guide features and lower guide tracks can be fixed elements of the internal guide track system/frame or they can be comprised of removable pieces that can be easily replaced throughout the life of the elliptical bicycle.

The upper guide features help to achieve a proper gap spacing between the drive wheels and the top of the internal guide track system over the lifetime of the elliptical bicycle. If there is too much space (i.e., too much gap spacing) between the drive wheels and the top of the internal guide track system, the drive wheels can "jump" the guidance features in the lower tracks and get stuck at an angle or rub against the sides of the guide track tubes. If the spacing is too tight, there will be too much contact/friction between the tops of the drive wheels and the top of the internal guide track system. Getting this gap spacing correct is complicated by the fact that the drive wheels wear down over the lifetime of the elliptical bicycle and, thus, the gap between the drive wheels and the top of the internal guide track system will continue to increase over time.

The upper guide features also include a low coefficient of friction contact surface to minimize friction when contacting the drive wheels.

The lower guide tracks and upper guide features serve to direct the forward ends of the foot links along a reciprocal path of travel. Some of the aspects of the lower guide tracks and upper guide features are: 1) they provide a guidance system for the foot link interface that enables an inexpensive, low friction, and simple interface to function effectively; 2) they provide an elegant method of ensuring that the foot links remain coupled to the frame during operation; 3) they can be made of or include a hard material such as steel or stainless steel or aluminum treated with a hard coating such as hard anodization or electroless nickel to improve resistance to wear; and 4) they can be modular and, therefore, can be easily replaced when worn. Each of these aspects is described in turn below.

1) Guidance system: The lower guide tracks are designed so that they have features that ensure the bearings at the end of the drive arms travel in a nearly straight line and are prevented from contacting the walls of the structural member.

2) Retention method: Because the foot links interface with the guide tracks inside of structural members, the foot links are retained onto the frame (and therefore prevented from disengaging with the frame) by the engagement between the frame member itself and the mechanism coupling the foot links to the guide tracks (usually one or more wheels, but also could be a ceramic bearing, etc.). As a result, unlike external track systems, an internal track system does not require an additional retention mechanism.

3) Hardness: Since they are or include a wear surface, the guide tracks and/or guide features can be made of or include a hard material or aluminum coated with a hard finish to improve the life of the guide tracks and minimize the aluminization of the mechanism coupling the foot links to the guide tracks that can occur during operation over bare aluminum. The guide tracks could also be made of a softer material such as plastic. This would insure that the majority of the wear in the sliding interface would occur to the lower guide tracks and not the foot link coupling mechanism. The plastic guide tracks would protect the structural frame from wear and could be cheaply and easily replaced throughout the life of the product.

4) Modularity: The lower guide tracks and/or upper guide features can be easily extracted from the elliptical bicycle and easily replaced with new guide tracks and/or guide features. Over time, friction caused by the interface of the guide tracks and or guide features and the foot link coupler will cause both the coupler and the guide tracks and/or guide features to wear. The modular system allows for the easy replacement of the guide tracks and/or guide features when they become worn or damaged. The modularity also enables the use of a hard or hard-coated material to be limited to the guide tracks and/or guide features only. If the guide tracks and/or guide features were not removable, then a larger structure would have to be made of the hard or hard-coated material adding cost and weight. The modularity could also enable the guide tracks and/or guide features to be made of a softer material such as a plastic. These softer guide tracks and/or guide features would insure that the majority of the wear would take place on the track side of the sliding interface and would preserve the life of the foot link couplers if they are made from a harder material. The plastic guide tracks and/or guide features would protect the structural frame from wear and could be cheaply and easily replaced throughout the life of the product.

Thus, the internal guide track system eliminates the need for an additional coupling mechanism to keep the foot links securely attached to the frame; allows for a sufficiently long stride length; maximizes the likelihood that the foot links will remain coupled to the frame and not disengage during operation; and modularity enables the easy replacement of worn guide tracks and/or guide features and allows for hard materials or coatings to be limited to the guide tracks and/or guide features exclusively, which are small surfaces, thereby minimizing cost and weight.

Another aspect of the invention involves an apparatus including a frame with a pivot axis defined thereupon; a drive wheel coupled to the frame; a first and a second foot link operably coupled to drive wheel to transfer power to said drive wheel so as to propel the apparatus, each including a foot receiving portion for receiving an operator's foot, a front end, and a rear end; and a pair of internal guide track systems coupled to the frame, each internal guide track system being operative to engage the front end of its respective foot link and to direct said front end along a reciprocating path of travel while providing retention to each foot link.

A further aspect of the invention involves an apparatus including a frame having a drive wheel rotatably supported thereupon, and a first pivot axis defined thereupon; a first and a second foot link, each having a front end, a rear end, and a foot receiving portion defined thereupon; a coupler assembly which is in mechanical communication with said pivot axis and with a rear end of each of said first and second foot links, said coupler assembly being operative to direct said rear ends of said foot links in an arcuate path of travel; a pair of internal guide track systems coupled to the frame, each internal guide track system being operative to engage the front end of each foot link and to direct said front end along a reciprocating path of travel while providing retention to each foot link; and a power transfer linkage in mechanical communication with said coupler assembly and with said drive wheel; whereby when the rear end of one of said foot links travels in said arcuate path and the front end of that foot link travels in said reciprocal path, an operator's foot supported thereupon travels in a generally elliptical path of travel, and said power transfer linkage transfers power from said coupler assembly to said drive wheel, so as to supply propulsive power thereto.

One or more implementations of the aspects of the invention described above include one or more of the following: the internal guide track system contains at least one structure configured to influence the reciprocating path of each foot link; the structure is removable from said internal guide track system; the internal guide track system includes one or more lower guide tracks; the one or more lower guide tracks are removable with respect to the internal guide track system; the front end of each foot link includes one or more load wheels, and the one or more lower guide tracks support the one or more load wheels for reciprocating path movement thereon and laterally influence the reciprocating path of the one or more load wheels; the one or more lower guide tracks are slidably removable with respect to the internal guide track system; the internal guide track system includes one or more upper guide features; the one or more respective upper guide features are removable with respect to the internal guide track system; the front end of each foot link includes one or more load wheels, and the one or more upper guide features are positioned to vertically influence the reciprocating path of the one or more load wheels there under; the one or more upper guide features are slidably removable with respect to the internal guide track system; the internal guide track system includes a longitudinal length and a bottom center, and a debris collecting gutter that extends along the longitudinal length, along the bottom center; the front end of each foot link includes one or more load wheels and the internal guide track system substantially encloses, contains, and protects the one or more load wheels from the environment; the front end of each foot link includes a top, a bottom, and sides, and the internal guide track system retains the top, bottom, and sides of the front end of each foot link; the internal guide track system vertically retains the top and the bottom of the front end of each foot link; and/or the internal guide track system laterally retains the sides of the front end of each foot link.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
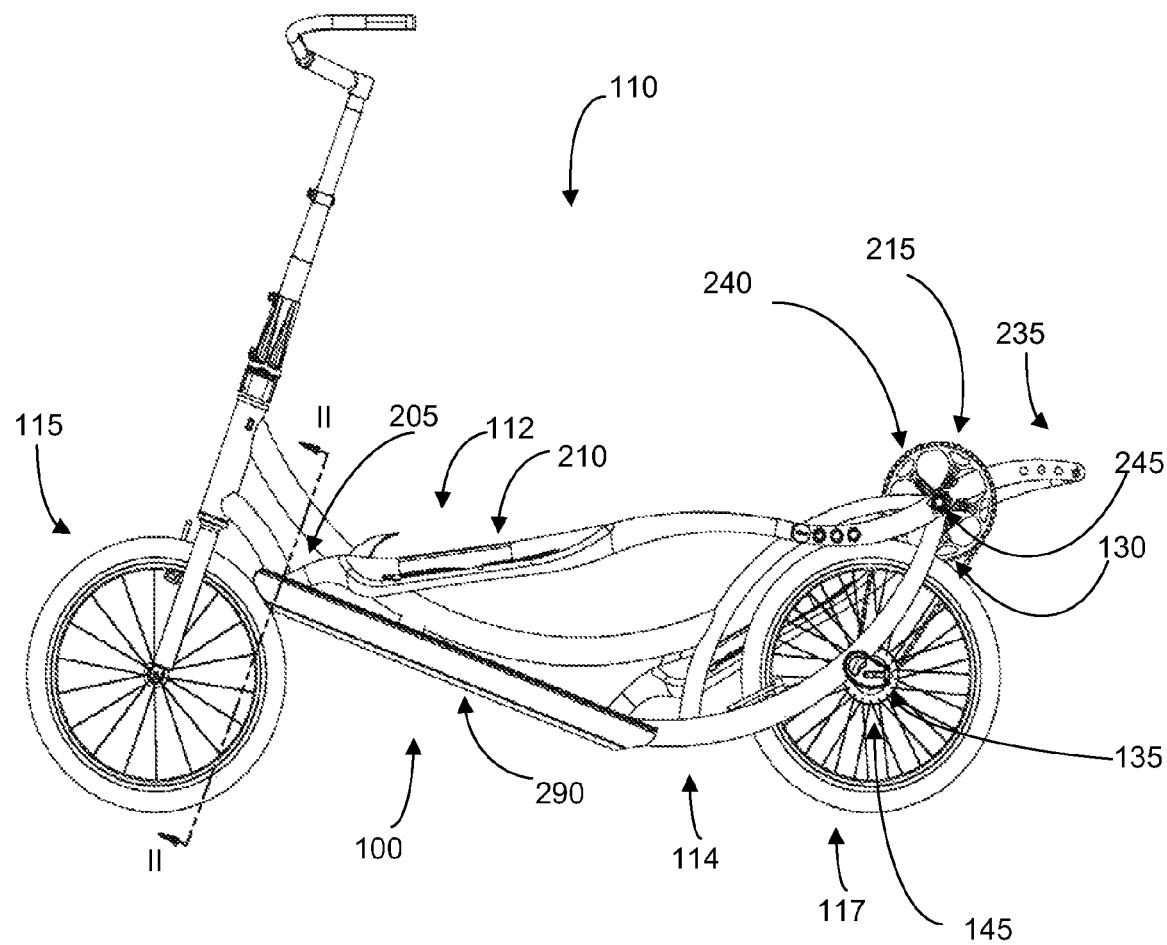
FIG. 1 is a front-elevational view of an embodiment of an elliptical bicycle including an internal guide track system constructed in accordance with an embodiment of the invention.
Figure 2:
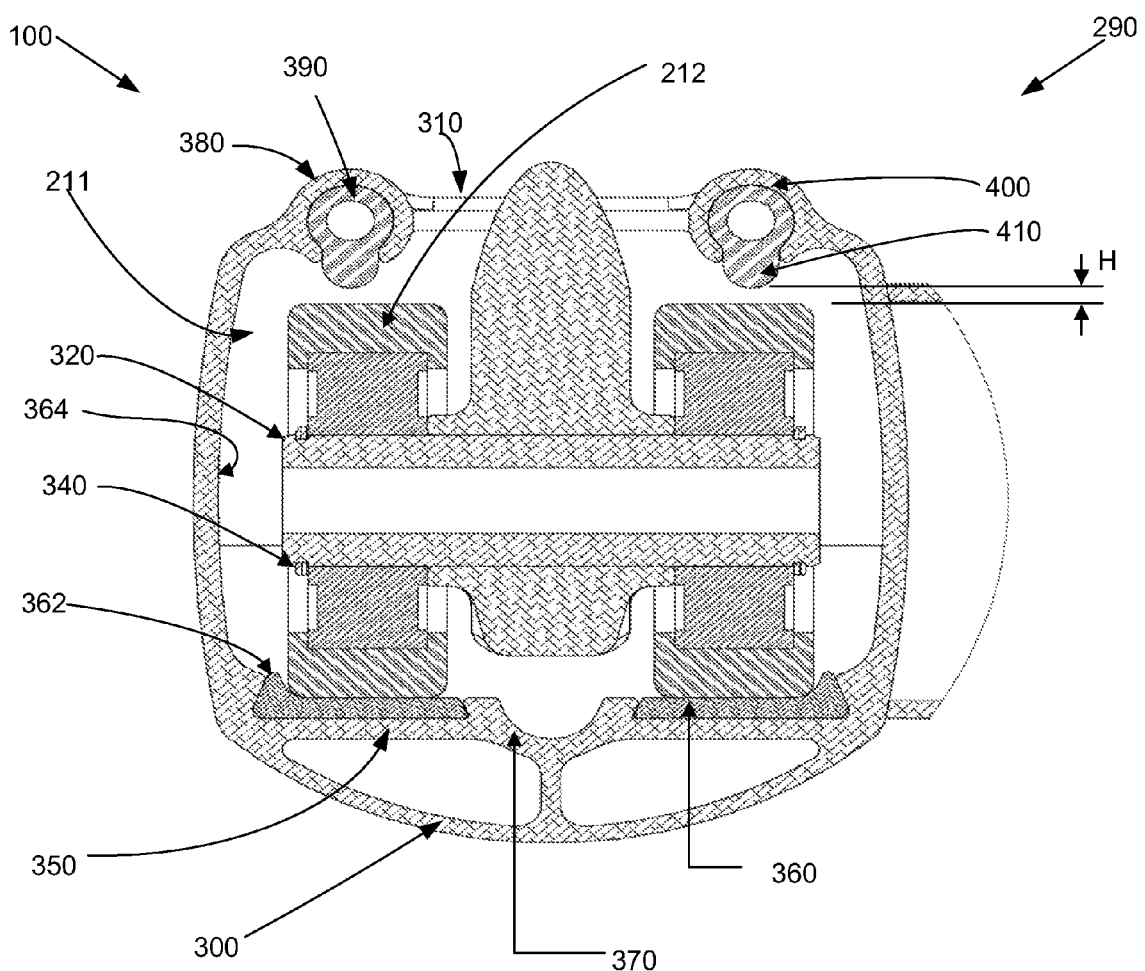
FIG. 2 is an enlarged cross-sectional of the internal guide track system taken along II-II of FIG. 1.

With reference to FIGS. 1 and 2, an embodiment of an internal guide track system 100 of an elliptical bicycle 110 is shown. Before describing the internal guide track system 100, the elliptical bicycle 110 will first be described.

The elliptical bicycle 110 includes a foot link assembly 112 movably mounted on a frame, or frame structure 114, on which a pair of wheels (front wheel 115, rear wheel 117) are mounted. Generally, each foot link assembly 112 is movably mounted to the frame 114 at its forward end where it is slidably coupled to a foot link guide track 290 (of the internal guide track system 100) and at its rearward end where it is rotatably coupled to a crank assembly 215.

In the present embodiment, each foot link assembly 112 includes a foot link 205, each with a foot platform 210, and a foot link coupler 211 that contacts the foot link guide track 290. In this embodiment, the foot link coupler 211 is comprised of two load wheels; however, in other embodiments, the foot link coupler can be comprised of any number of slidable devices, including a single wheel, a linear bearing, three or more wheels, etc. The foot platforms 210 on which the operator stands are mounted on an upper surface of each foot link 205 near a forward end of each foot link 205. In the embodiment depicted in FIG. 1, the internal guide track system 100 includes two foot link guide tracks 290 running parallel to each other on either side of the longitudinal axis of the elliptical bicycle 110 and are connected to or integral with the frame 114. The two load wheels that comprise each foot link coupler 211 are mounted to a fixed axle 320 coupled to each foot link 205 to allow nearly frictionless linear motion of the foot links 205 along the foot link guide tracks 290.

At the rear of the elliptical bicycle 110, adjacent the rear wheel 117, are crank arms 235, a drive sprocket 240, a crank arm bearing 245, a chain 130, a rear wheel sprocket 135, and a rear wheel hub 145. The crank arms 235 are mated to the crank arm bearing 245, which is coupled to the frame 114 of the elliptical bicycle 110, to turn the drive sprocket 240.

During pedaling, the operator (not shown) uses his mass in a generally downward and rearward motion as in walking or jogging to exert a force on the foot platforms 210 and thereby, the foot links 205. This force causes the load wheels 212 to roll along the foot link guide track 290 towards the rear of the elliptical bicycle 110 and rotate the crank arms 235 about the crank arm bearing 245, turning the drive sprocket 240. As with conventional bicycles, rotating the drive sprocket 240 causes the rear wheel sprocket 135 to rotate because they are linked by the chain 130. It will be appreciated that in other embodiments, the chain 130 may be replaced by a belt, rotating shaft or other drive means, or the chain 130, drive sprocket 240 and rear wheel sprocket 135 may be eliminated altogether by coupling the crank arms 235 directly to the rear wheel hub 145. In this embodiment, rotating the rear wheel sprocket 135 causes the rear wheel 117 to rotate because the rear wheel sprocket 135 is attached to the rear wheel hub 145. Rotating the rear wheel 117 provides motive force that enables the elliptical bicycle 110 to move along a surface. The elliptical bicycle 110 can employ a "fixed" or "free" rear wheel, as is known in the art. The elliptical bicycle 110 can also employ a planetary gear hub or derailleur system having different gear ratios.

Pedaling the elliptical bicycle 110 as described above results in the operator's foot traveling in a shape that can be described as generally elliptical. Propulsion using an elliptical pedaling motion, as opposed to an up-and-down pedaling motion or a circular pedaling motion, has the advantage of substantially emulating a natural human running or walking motion. Further, an elliptical pedaling motion is a simpler and a more efficient means to rotate the rear wheel 117 than is, for example, a vertical pumping motion. Moreover, the major axis of the ellipse in an elliptical pedaling motion can be much longer than the stroke length of a circular or vertical pumping pedaling motion, allowing the operator to employ a larger number of muscle groups over a longer range of motion during the pedal stroke than he or she could employ in a circular or up and down pedaling motion.

The internal guide track system 100 will now be described in more detail. The internal guide track system 100 includes one or more lower guide tracks 360 and/or one or more upper guide features 390 contained inside of elongated hollow, generally tubular frame 300 which form the interface between the foot link coupler 211 and the frame 114 of the elliptical bicycle 110. The internal guide track system 100 ensures that the foot link coupler 211 reciprocates efficiently along the lower guide tracks 360 while the foot links 205 stay coupled to the elliptical bicycle 110 as part of a drive system that allows for a long stride length (>20 inches).

The internal guide track system 100 can include an elongated hollow, generally tubular frame 300 with an elongated narrow slot 310 along a top of the frame 300 that the foot link 205 reciprocates within. The foot link 205 is connected to the load wheels 212 by an axle 320. Snap rings 340 or other fasteners are used to secure the load wheels 212 to the axle 320.

A bottom, interior portion of the frame 300 includes track-receiving recesses 350 that receive respective removable lower guide tracks 360 that the load wheels 212 roll upon. The removable lower guide tracks 360 can be comprised of one or more of the following materials: hard anodized aluminum, electro less nickel coated aluminum, hardened steel/stainless steel, plastic. The removable lower guide tracks 360 can include an elongated curb 362 along an outer edge of the removable lower guide track 360 to ensure the load wheels 212 at the end of the foot links 205 travel in a nearly straight line and are prevented from contacting the inner side walls 364 of the frame 300. The frame 300 can include an elongated debris gutter 370 extending the length of the frame 300 along a bottom center of the frame 300. Debris can collect in and drain from the internal guide track system 100 via the gutter 370.

At a top of the frame 300 are elongated penannular, substantially tubular guide recesses 380 that respectively receive removable upper guide features 390. The removable upper guide features 390 can include an elongated tubular member 400 and a downwardly extending gap limiter 410. Because the elliptical bicycle 110 is ridden outdoors, occasionally there will be a force applied to the elliptical bicycle 110 such that the rider and foot links 205 are propelled upwards. In such circumstances, the foot link coupler 211 riding on the lower guide tracks 360 can contact the lower engagement surfaces of the downwardly extending gap limiters 410 of the upper guide features 390. The vertical length of the downwardly extending gap limiter 410 determines the gap spacing or vertical distance H between a top of the load wheel 212 and a bottom of the downwardly extending gap limiter 410 for limiting the amount of vertical "jump" of the load wheels 212 within the internal guide track system 100. The removable nature of the removable upper guide features 390 enables upper guide features 390 of different dimensions (e.g., different sized/configured downwardly extending gap limiter 410) to be used, thereby modifying the gap H between the load wheels 212 and the upper guide features 390.

The vertical thickness of downwardly extending gap limiter 410 is sized to achieve a proper gap spacing between a bottom thereof and the load wheels 212 as well as to minimize the friction between the load wheels 212 and the downwardly extending gap limiter 410 that results when the load wheels 212 come in contact with the downwardly extending gap limiter 410. If the gap spacing H is too much, the load wheels can "jump" the guidance features (e.g., curbs 362) in the lower guide tracks 360 and get stuck at an angle or rub against the sides of the guide track tube frames 300. If the gap spacing H is too tight, there will be too much contact between the tops of the load wheels 212 and the downwardly extending gap limiter 410. Getting this gap spacing H correct is complicated by the fact that the load wheels 212 wear down over the lifetime of the elliptical bicycle 110 and, thus, the gap H between the load wheels 212 and the downwardly extending gap limiter 410 will continue to increase over time.

In alternative embodiment(s), the frame 300 of the internal guide tracks 290 includes other numbers (e.g., 1, 3, 4, 5. etc) of lower guide tracks 360 and/or upper guide features 390, does not include upper guide features 390, and/or does not include lower guide tracks 360. For example, but not by way of limitation, guidance and retention methods can be accomplished via the structure of the generally tubular frame 300 without the addition of upper guide features 390 and lower guide tracks 360. In this embodiment, the load wheels 212 would directly contact guide tracks that are integral with and a part of the frame 300. For example, but not by way of limitation, the load wheels 212 may ride within guide tracks similar to the track recesses 350. In such an embodiment, features such as elongated curbs 362 may be part of the track recesses 350 and frame 300. In this embodiment, the majority of wear would take place on the track recesses of the frame 300 so the load wheels 212 may be made of a softer material to reduce wear on the frame 300.

Figure 3:
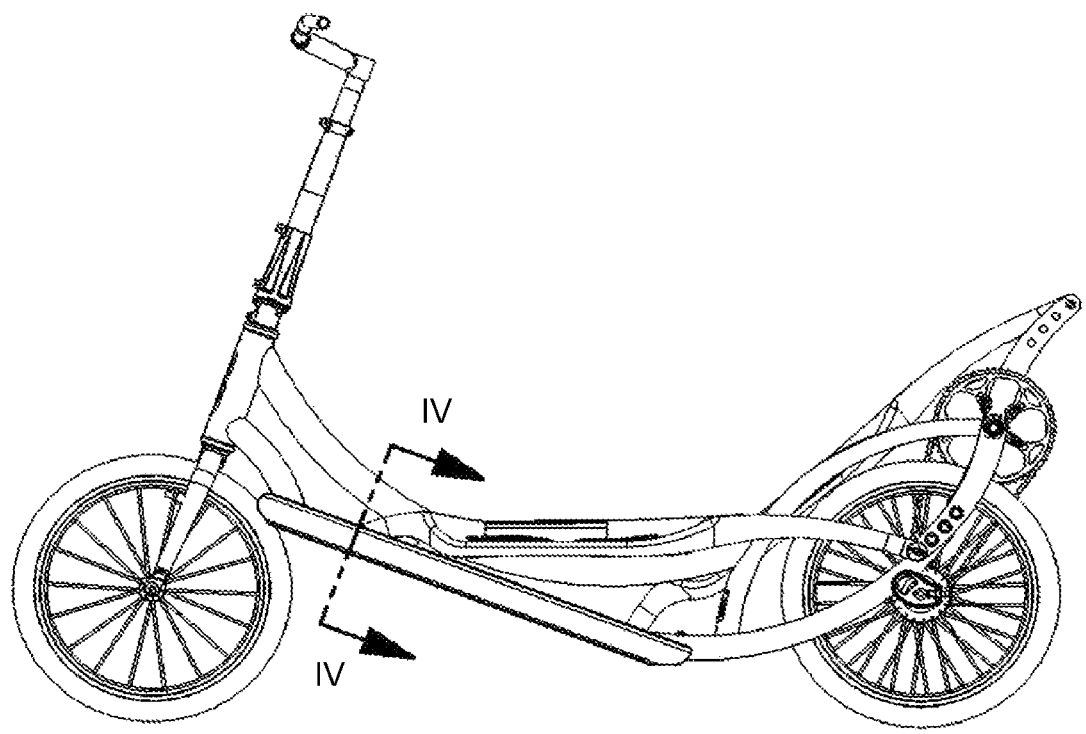
FIG. 3 is a front-elevational view of another embodiment of an elliptical bicycle including an internal guide track system constructed in accordance with an alternative embodiment of the invention.
Figure 4:
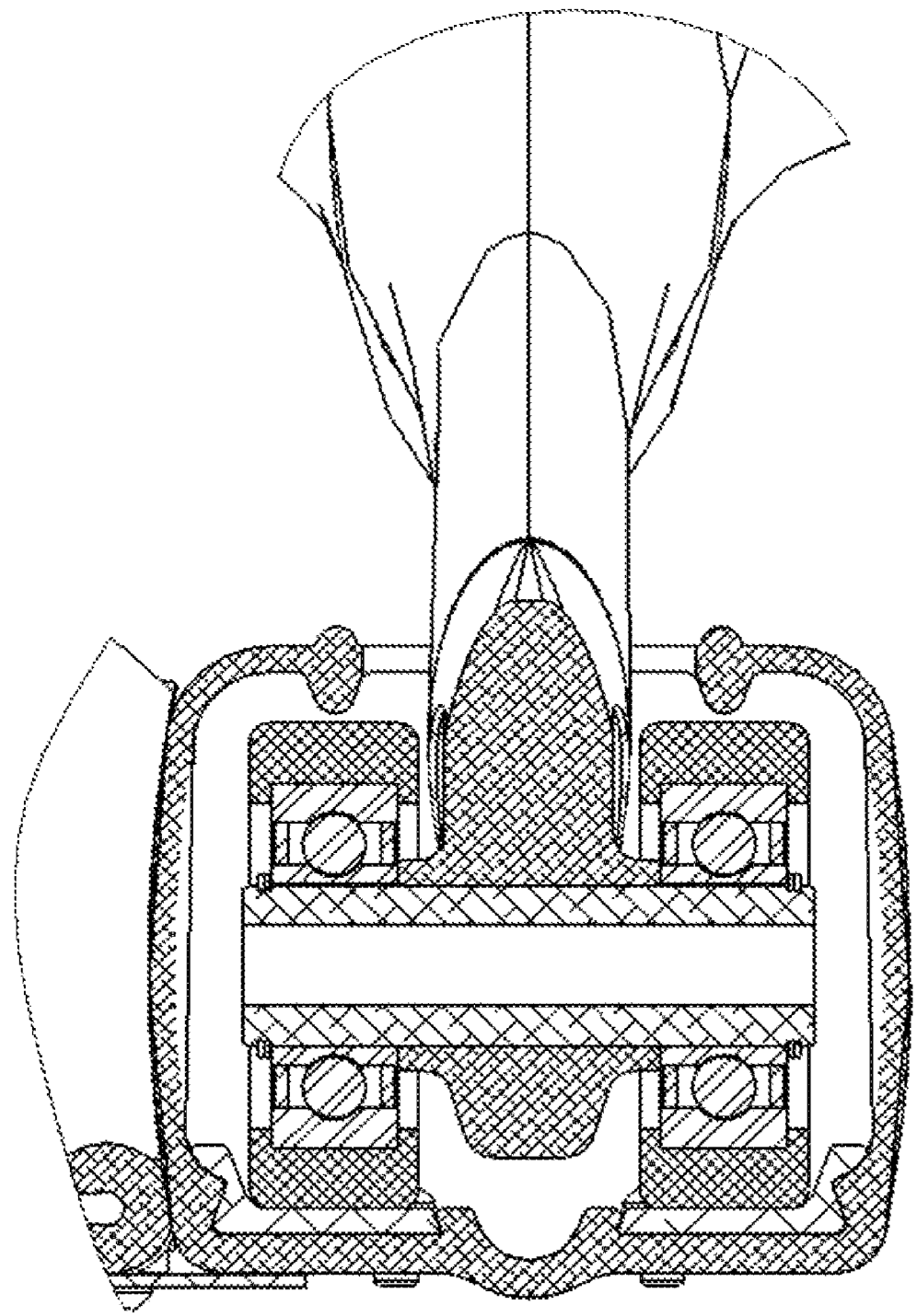
FIG. 4 is an enlarged cross-sectional of the alternate embodiment of the internal guide track system taken along IV-IV of FIG. 3.

An alternative embodiment is depicted in FIGS. 3 and 4, whereby the internal guide track system includes removal lower guide tracks and fixed upper guide features. In this embodiment, the gap spacing between the load wheels and the upper guide features is set at the distance between the lower guide tracks and the bottom of the fixed upper guide features. The lower guide tracks are removable and easily replaceable when worn, however, the upper guide features are an element of the frame of the internal guide track system and cannot be easily replaced.

Some advantages of the internal guide track system 100 are: 1) it provides a guidance system for the foot link coupler 211 that enables an inexpensive, low friction, and simple interface to function effectively; 2) it provides an elegant method of ensuring that the foot links 205 remain coupled to the frame 300 during operation; 3) it can include removable upper guide features and 390/or lower guide tracks 360 made of a hard material or aluminum coated with a hard finish to improve resistance to wear, without changing the material properties of the frame 300; and 4) it can be modular and, therefore, worn elements can be easily replaced. Each of these aspects/advantages is described in turn below.

1) Guidance system: The upper guide features and lower guide tracks 360, 390 are designed so that they have features (e.g., outer elongated curbs 362, downwardly extending gap limiter 410) that ensure the foot link coupler 211 at the end of the foot links 205 travels in a nearly straight line and does not contact the walls 364 of the frame 300.

2) Retention method: Because the foot links 205 interface with lower guide tracks 360 and upper guide features, 390 inside of structural members (i.e., frame 300), the foot links 205 are retained onto the frame 300 (and therefore prevented from disengaging with the frame 300) by the engagement between the frame member itself and the foot link coupler 211 (usually one or more load wheels 212, but also could be a linear bearing, etc.). As a result, the internal guide track system 100 does not require an additional retention mechanism (unlike external track systems).

3) Hard anodization: Since they are a wear surface, the upper guide features 390 and lower guide tracks 360 can be made of or include a hard material or aluminum coated with a hard finish to increase their life and minimize the aluminization of the load wheels 212 that can occur during operation over machined aluminum that has not been anodized.

4) Modularity: The upper guide features 390 and lower guide tracks 360 can be easily removed from the elliptical bicycle 110 and replaced with new guide tracks and/or guide features. Over time, friction caused by the interface of the load wheels 212 and the upper guide features 390 and/or lower guide tracks 360 will cause both the load wheels 212 and the guide tracks/guide features 360, 390 to become worn. The modular system allows for the easy replacement of the upper guide features 390 and lower guide tracks 360 when they become worn or damaged. For example, in an embodiment of the internal guide track system 100, the internal guide track system 100 may include end(s) accessible by a door/cap/cover for removably replacing the upper guide features 390 and lower guide tracks 360. The modularity also enables the use of a hard or specialty hard coated material to be limited to the engaged surface of the upper guide features 390 and/or lower guide tracks 360 only. If the upper guide features 390 and/or lower guide tracks 360 were not removable, then a larger structure would have to be made of a hard or specialty hard coated material, adding cost and weight.

In an alternative embodiment, the modularity enables the upper guide features 390 and/or lower guide tracks 360 to be made of a softer material such as a plastic. These softer guide tracks/features 360, 390 would insure that the majority of the wear would take place on the track side of the rolling interface and preserve the life of the load wheels 212 if they were made from a harder material. The plastic guide tracks/features 360, 390 would protect the structural frame from wear and could be cheaply and easily replaced throughout the life of the product.

Additionally, or alternatively, the entire internal guide track system 100 may be easily extracted from the frame 114 of the elliptical bicycle 110 and easily replaced with a new internal guide track system 100. Thus, one or more of the entire internal guide track system 100 and components (e.g., guide tracks/features 360, 390) allow for modularity and interchangeability.

Thus, the internal guide track system 100 eliminates the need for an additional coupling mechanism to keep the foot links 205 coupled to the frame 300; allows for a sufficiently long stride length; maximizes the likelihood that the foot links 205 will remain coupled to the frame and not disengage during operation; hard anodization reduces the rate of wear on the upper guide features 390 and/or lower guide tracks 360 and "aluminization" of the load wheels 212 during operation; and modularity enables the easy replacement of one or more of the entire internal guide track system 100 and worn upper guide features 390 and/or lower guide tracks 360 and allows for the use of a hard or specially hard coated material to be limited to the engagement surface of the upper guide features 390 and/or lower guide tracks 360 exclusively, which are small surfaces, thereby minimizing cost and weight. Use of a softer material such as plastic would insure that the majority of the wear would take place on the track side of the rolling interface and would preserve the life of the load wheels 212 if made from a harder material. The plastic upper guide features 390 and/or lower guide tracks 360 protect the structural frame 300 from wear and are cheaply and easily replaced throughout the life of the product.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. An apparatus, comprising:
    a frame with a pivot axis defined thereupon;
    a drive wheel coupled to the frame;
    a first and a second foot link operably coupled to the drive wheel to transfer power to said drive wheel so as to propel the apparatus, each including a foot receiving portion for receiving an operator's foot, a front end, and a rear end;
    a pair of internal guide track systems coupled to the frame, each internal guide track system being operative to engage the front end of its respective foot link and to direct said front end along a reciprocating path of travel while providing retention to each foot link,
    wherein at least one of said internal guide track systems includes one or more lower guide tracks that are removable with respect to the internal guide track system.

2. The apparatus of claim 1, wherein said internal guide track system contains at least one upper guide feature configured to influence the reciprocating path of the respective foot link.

3. The apparatus of claim 2, wherein said upper guide feature is removable from said internal guide track system.

4. The apparatus of claim 1, wherein the front end of each foot link includes one or more load wheels, and the one or more lower guide tracks support the respective one or more load wheels for reciprocating path movement thereon and laterally influence the reciprocating path of the respective one or more load wheels.

5. The apparatus of claim 1, wherein the one or more lower guide tracks are slidably removable with respect to the internal guide track system.

6. The apparatus of claim 1, wherein the internal guide track system includes a longitudinal length and a bottom center, and a debris collecting gutter that extends along the longitudinal length, along the bottom center.

7. The apparatus of claim 1, wherein the front end of each foot link includes one or more load wheels and the internal guide track system substantially encloses, contains, and protects the respective one or more load wheels from the environment.

8. The apparatus of claim 1, wherein the front end of each foot link includes a top, a bottom, and sides, and the internal guide track system retains the top, bottom, and sides of the front end of the respective foot link.

9. The apparatus of claim 8, wherein the internal guide track system vertically retains the top and the bottom of the front end of the respective foot link.

10. The apparatus of claim 8, wherein the internal guide track system laterally retains the sides of the front end of the respective foot link.

11. An apparatus, comprising:
    a frame with a pivot axis defined thereupon;
    a drive wheel coupled to the frame;
    a first and a second foot link operably coupled to the drive wheel to transfer power to said drive wheel so as to propel the apparatus, each including a foot receiving portion for receiving an operator's foot, a from end, and a rear end;
    a pair of internal guide track systems coupled to the frame, each internal guide track system being operative to engage the front end of its respective foot link and to direct said front end along a reciprocating path of travel while providing retention to each foot link, wherein at least one of said internal guide track systems includes one or more upper guide features that are removable with respect to the internal guide track system.

12. The apparatus of claim 11, wherein the front end of each foot link includes one or more load wheels, and the one or more upper guide features are positioned to vertically influence the reciprocating path of the one or more load wheels thereunder.

13. The apparatus of claim 11, wherein the one or more upper guide features are slidably removable with respect to the internal guide track system.

14. An apparatus, comprising:
    a frame having a drive wheel rotatably supported thereupon, and a first pivot axis defined thereupon;
    a first and a second foot link, each having a front end, a rear end, and a foot receiving portion defined thereupon;
    a coupler assembly which is in mechanical communication with said pivot axis and with a rear end of each of said first and second foot links, said coupler assembly being operative to direct said rear ends of said foot links in an arcuate path of travel;
    a pair of internal guide track systems coupled to the frame, each internal guide track system being operative to engage the front end of each foot link and to direct said front end along a reciprocating path of travel while providing retention to each foot link;
    a power transfer linkage in mechanical communication with said coupler assembly and with said drive wheel; whereby when the rear end of one of said foot links travels in said arcuate path and the front end of that foot link travels in said reciprocal path, the respective foot receiving portion travels in a generally elliptical path of travel, and said power transfer linkage transfers power from said coupler assembly to said drive wheel, so as to supply propulsive power thereto,
    wherein at least one of said internal guide track systems includes one or more lower guide tracks that are removable with respect to the internal guide track system.

15. The apparatus of claim 14, wherein said internal guide track system contains at least one upper guide feature configured to influence the reciprocating path of each foot link.

16. The apparatus of claim 14, wherein said internal guide track system contains at least one upper guide feature configured to influence the reciprocating path of each foot link, and said upper guide feature is removable from said internal guide track system.

17. The apparatus of claim 14, wherein the front end of each foot link includes one or more load wheels, and the one or more lower guide tracks support the respective one or more load wheels for reciprocating path movement thereon and laterally influence the reciprocating path of the respective one or more load wheels.

18. The apparatus of claim 14, wherein the one or more lower guide tracks are slidably removable with respect to the internal guide track system.

19. The apparatus of claim 14, wherein the internal guide track system includes a longitudinal length and a bottom center, and a debris collecting gutter that extends along the longitudinal length, along the bottom center.

20. The apparatus of claim 14, wherein the front end of each foot link includes one or more load wheels and the internal guide track system substantially encloses, contains, and protects the respective one or more load wheels from the environment.

21. The apparatus of claim 14, wherein the front end of each foot link includes a top, a bottom, and sides, and the internal guide track system retains the top, bottom, and sides of the front end of the respective foot link.

22. The apparatus of claim 21, wherein the internal guide track system vertically retains the top and the bottom of the front end of the respective foot link.

23. The apparatus of claim 21, wherein the internal guide track system laterally retains the sides of the front end of the respective foot link.

24. An apparatus, comprising:
   a frame having a drive wheel rotatably supported thereupon, and a first pivot axis defined thereupon;
   a first and a second foot link, each having a front end, a rear end, and a foot receiving portion defined thereupon;
   a coupler assembly which is in mechanical communication with said pivot axis and with a rear end of each of said first and second foot links, said coupler assembly being operative to direct said rear ends of said foot links in an arcuate path of travel;
   a pair of internal guide track systems coupled to the frame, each internal guide track system being operative to engage the front end of each foot link and to direct said front end along a reciprocating path of travel while providing retention to each foot link;
   a power transfer linkage in mechanical communication with said coupler assembly and with said drive wheel; whereby when the rear end of one of said foot links travels in said arcuate path and the front end of that foot link travels in said reciprocal path, the respective foot receiving portion travels in a generally elliptical path of travel, and said power transfer linkage transfers power from said coupler assembly to said drive wheel, so as to supply propulsive power thereto, wherein at least one of said internal guide track systems includes one or more upper guide features that are removable with respect to the internal guide track system.

25. The apparatus of claim 24, wherein the front end of each foot link includes one or more load wheels, and the one or more upper guide features are positioned to vertically influence the reciprocating path of the one or more load wheels thereunder.

26. The apparatus of claim 24, wherein the one or more upper guide features are slidably removable with respect to the internal guide track system.

* * * * *